United States Patent [19]

Nakayama et al.

[11] Patent Number: 5,285,448
[45] Date of Patent: Feb. 8, 1994

[54] TRANSMISSION SYSTEM OF SYSTEM CONTROL INFORMATION IN A RING LAN SYSTEM

[75] Inventors: Haruyuki Nakayama; Fumio Sukegawa, both of Ebina; Yoshihiro Takiyasu, Higashimurayama, all of Japan

[73] Assignee: Hitachi, Ltd., Tokyo, Japan

[21] Appl. No.: 661,063

[22] Filed: Feb. 25, 1991

[30] Foreign Application Priority Data

Mar. 1, 1990 [JP] Japan .................................. 2-50647

[51] Int. Cl.⁵ .......................... H04J 3/02; H04J 3/12
[52] U.S. Cl. ................................ 370/85.15; 370/85.5; 370/85.12; 370/85.14; 370/110.1
[58] Field of Search ................ 340/825.05; 370/85.5, 370/85.6, 85.12, 85.14, 85.15, 110.1

[56] References Cited

U.S. PATENT DOCUMENTS

| | | | |
|---|---|---|---|
| 4,064,486 | 12/1977 | Faber | 370/85.15 |
| 4,710,915 | 12/1987 | Kitahara | 370/85.12 |
| 4,769,839 | 9/1988 | Preineder et al. | 370/85.15 |
| 4,899,142 | 2/1990 | Nakayashiki et al. | 370/85.15 |
| 4,926,418 | 5/1990 | Cidon et al. | 370/85.15 |
| 4,930,119 | 5/1990 | Kobayashi et al. | 370/16.1 |
| 5,081,654 | 1/1992 | Stephenson, Jr. et al. | 375/106 |
| 5,103,447 | 4/1992 | Takiyasu et al. | 370/85.15 |

Primary Examiner—Curtis Kuntz
Assistant Examiner—Vijay Shankar
Attorney, Agent, or Firm—Fay, Sharpe, Beall, Fagan, Minnich & McKee

[57] ABSTRACT

In a system control information transmission system in a ring LAN system, each of a plurality of data transmission devices transmits a transmission frame including a user information transmission area and a system control information transmission area to an adjacent data transmission device at peculiar periods independent of the state of the system, i.e., a failure in the system. The system control information transmission area in the transmission frame is used to transmit system control information only required to be relayed to a downstream data transmission device.

2 Claims, 4 Drawing Sheets

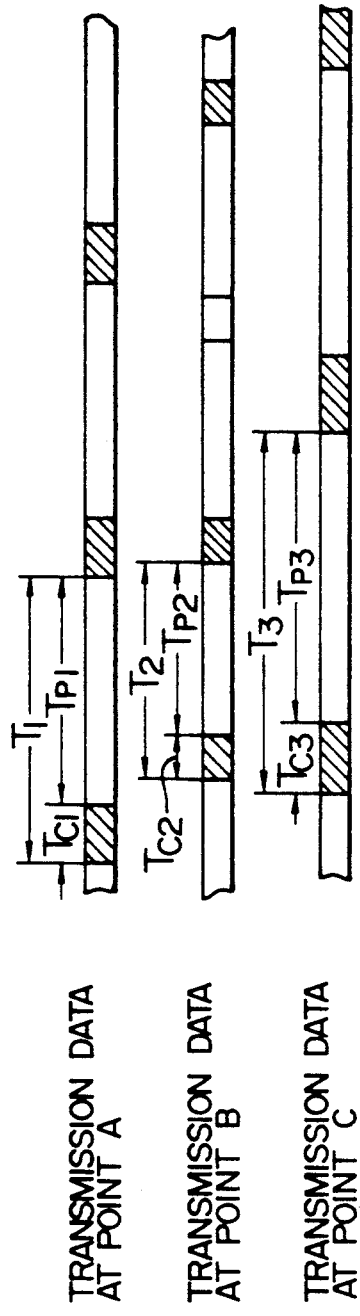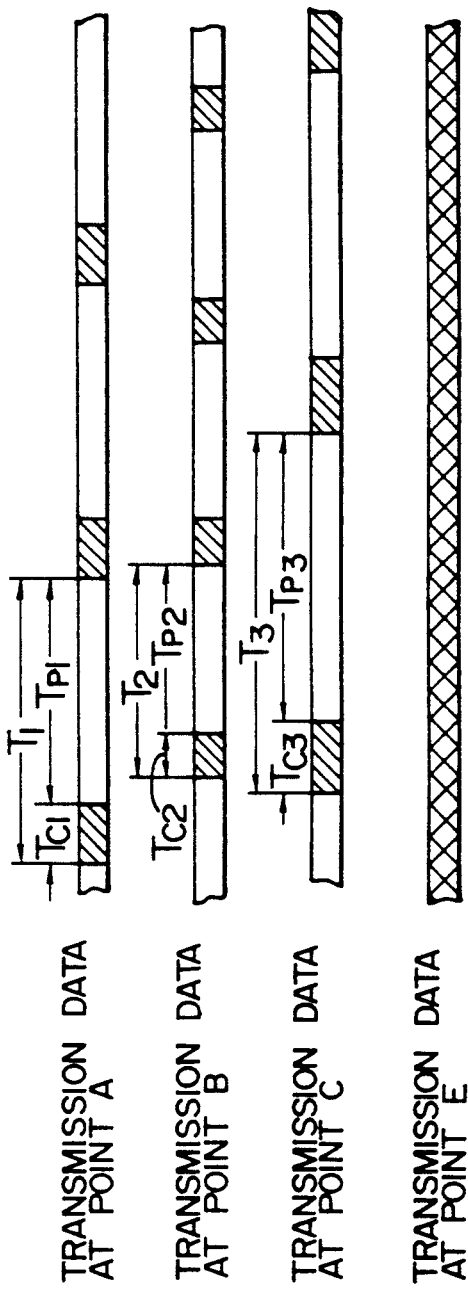

TRANSMISSION SYSTEM OF SYSTEM CONTROL INFORMATION IN A RING LAN SYSTEM

BACKGROUND OF THE INVENTION

The present invention relates to a data transmission in a ring LAN system and more particularly to transmission of system control information in the ring LAN system.

A technique concerning the data transmission in a ring LAN system in which a plurality of data transmission devices are connected in a ring through a transmission path, is disclosed known in Japanese Patent Unexamined Publication No. 61-210742.

In this technique, a data transmission device required to urgently transmit data can preferentially secure a special area of a data transmission area in a transmission frame which circulates the data transmission through the ring LAN system.

In the above technique, however, when one data transmission device uses the special area in a usual operation, another data transmission device can not use the special area.

As a result flexibility in utilization of the data transmission area is diminished and the data transmission area is not utilized efficiently. This causes a problem in that a waiting time from generating the point of a request for transmitting data to ann actual transmission thereof is increased.

Particularly, this problem is significantly important when the number of data transmission devices in the ring LAN system is increased.

Furthermore, when a failure such as disconnection of the transmission path occurs in the ring LAN system and circulation through the transmission frame in the ring LAN system is failed, circulation through the data transmission area in the ring LAN system is also failed, so that the data transmission is failed.

In the above case, a problem that means for transmitting data without use of the data transmission area must be arranged newly in the ring LAN system, thereby complicating the processes.

SUMMARY OF THE INVENTION

It is a first object of the present invention to provide a ring LAN system capable of utilizing a system control information transmission area which comprises a part of a data transmission area. Moreover, the system control information comprises control information required to control the ring LAN system during a failure of the transmission path.

Further, it is a second object of the present invention to provide a ring LAN system capable of transmitting the system control information by data transmission devices regardless of a state in the ring LAN system such as during a failure of the transmission path.

In order to achieve the first object in accordance with the present invention, both the system control information transmitted by each of the data transmission devices and system control information only required for relaying or transition, of information received from an adjacent data transmission device, are transmitted to an other adjacent data transmission device by using a system control information transmission area arranged fixedly in the transmission frame.

Furthermore, in order to achieve the second object, an independent synchronization system is adopted, and each of the data transmission devices transmits the system control information to the adjacent data transmission device by using the system control information transmission area provided fixedly in the transmission frame.

When the SONET frame of the CCITT standard is used as the transmission frame, it is desirable that a section overhead area is used as the fixed area arranged in the transmission frame. This is because its processing is simple and a payload area as the original user information transmission area is not affected.

According to the ring LAN system of the present invention, since each of the data transmission devices transmits the system control information to be transmitted by itself and the system control information only required for transition of information received from an adjacent data transmission device to the other adjacent data transmission device by using a system control information transmission area arranged fixedly in the transmission frame, therefore, the system control information transmission area can be utilized efficiently and a waiting time from generating a request of transmitting the system control information to transmission thereof can be reduced.

Furthermore, in the ring LAN system according to the present invention, the transmission frame for each of the data transmission devices adopts the independent synchronization system for each, and each of the data transmission devices uses the system control information transmission area which is fixedly arranged in the transmission frame. Accordingly, by transmitting the system control information, a failure can be eliminated and the system control information can be transmitted even though a failure occurs in the transmission path.

BRIEF DESCRIPTION OF THE DRAWINGS

FIG. 2 illustrates transmission data on each of the transmission path in the ring LAN system in the normal state;

FIG. 3 illustrates transmission data on each of the transmission path in the ring LAN system upon failure;

DESCRIPTION OF THE PREFERRED EMBODIMENTS

Embodiments of a ring LAN system according to the present invention are now described.

Figure 1:
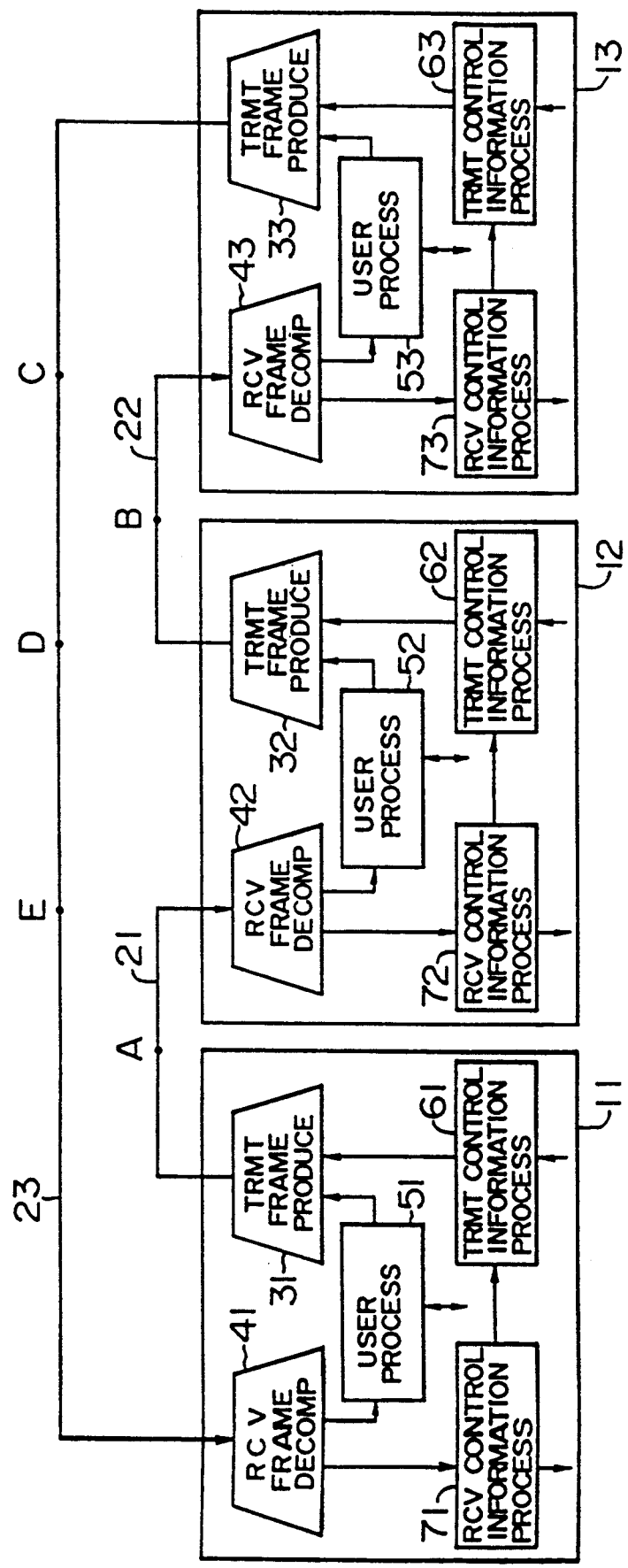
FIG. 1 is a block diagram illustrating a configuration of a ring LAN system according to an embodiment of the present invention.

FIG. 1 shows a configuration of the ring LAN system according to an embodiment.

In FIG. 1, numerals 11 to 13 denote data transmission devices, 21 to 23 denote transmission paths, 31 to 33 denote transmission frame producing units, 41 to 43 denote receipt frame decomposing units, 61 to 63 denote transmission control information producing units, and 71 to 73 denote receipt control information processing units.

The ring LAN system according to the present embodiment comprises the data transmission devices (hereinafter referred to as nodes) 11 to 13 and the transmission paths 21 to 23.

Each of the nodes comprises the transmission frame producing units 31-33, the receipt frame decomposing units 41-43, the user information exchange processing units 51-53, the transmission control information producing units 61-63, and the receipt control information processing units 71-73. In FIG. 1, the internal configuration of the nodes illustrates only portions pertinent to transmission of the system control information.

Each of the transmission paths is connected between pairs of transmission frame producing units 31-33 and receipt frame decomposing units 41-43 of adjacent nodes, respectively, and data is transmitted to the transmission path from the transmission frame producing unit 31-33 to the receipt frame decomposing unit 41-43 of an adjacent node unidirectionally. Hereinafter, when a node receives a frame, a node for transmitting the frame is referred to as an upstream node, while a node transmits a frame, a node for receiving the frame is referred to as a downstream node.

The ring LAN system according to the present invention may adopt a dependent synchronization system, while in the embodiment description is made to a case where the ring LAN system adopts an independent synchronization system.

Details of the ring LAN system adopted as the independent synchronism system is disclosed in ISO recommendation, 93141 FDDI PHY, Token Ring Physical Layer Protocol.

Operation of the ring LAN system is now described.

Each of the transmission frame producing units 31-33 in each node continuously prepare and transmit a transmission frame having a fixed capacity at independent periods without the influence of other nodes, the transmission path and other portions within its own node.

The transmission frame producing units 31-33 include selectors for selecting system control information from the transmission control information producing units 61-63 and user information from the user information exchange processing units 51-53 for transmission to the next stage.

FIG. 2 shows transmission data at points A, B and C (FIG. 1) on the transmission paths 21, 22 and 23, respectively.

Frame periods $T_1$, $T_2$ and $T_3$ are independent of each other. The capacity of one frame transmitted at every period is the same. Further, since the relationship $T_2 < T_1 < T_3$ exists, the transmission speed is highest at node 12 and lowest at node 13.

In each of the periods, the selectors in the transmission frame producing units 31, 32 and 33 fixedly assign system control information from the transmission control information producing units 61, 62 and 63 to areas $T_{C1}$, $T_{C2}$ and $T_{C3}$, system control information transmission areas, respectively, and also fixedly assign user information from the user information exchange processing units 51, 52 and 53 to areas $T_{P1}$, $T_{P2}$ and $T_{P3}$, user information transmission areas, respectively. The user information transmission areas are divided into slots, each of which is comprised of source address, destination address, propriety flag, data area, and the like.

Actually, the system control information includes a frame delimiter representing a boundary of the frame.

In each of the nodes, the receipt frame decomposing units 41-43 recognize a frame transmitted from the upstream node by means of the frame delimiter, and furthermore, confirm the system control information transmission area and the user information transmission area in the frame.

Each of the receipt frame decomposing units 41-43 transmits the user information in the user information transmission area to the user information exchange processing units 51-53, and the system control information in the system control information transmission area to the receipt control information processing units 71-73, respectively.

The user information exchange processing units 51-53 deliver the user information to a data processing function unit (not shown) if a slot directed to its own node, of the user information is received from the receipt frame decomposing units 41-43. The user information transmitted from its own node is transmitted from the data processing function unit to the user information exchange processing units 51-53 to be inserted into an empty slot of the user information transmission area in the transmission frame.

The receipt control information processing units 71-73 transmit system control information required to be relayed, or transited, to a downstream node and the corresponding transmission control information producing unit 61-63, when the system control information is transmitted from the receipt frame decomposing units 41-43, and transmit the system control information not required to be relayed to the downstream node, that is, directed to its own node, to its own transmission control information producing unit 61-63.

Figure 5:
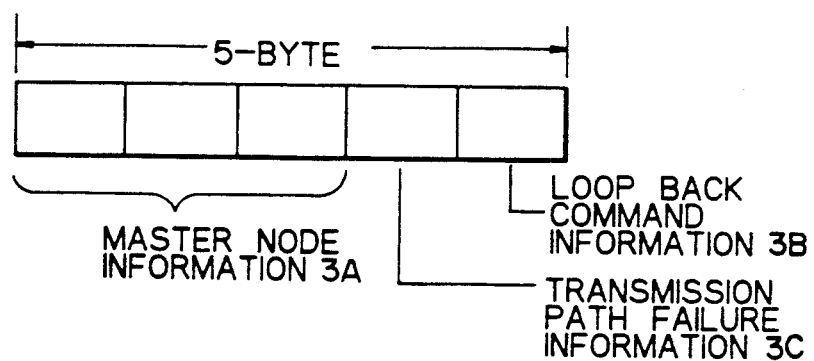
FIG. 5 illustrates a configuration of a system control information.

The transmission control information producing units 61-63 compose the system control information area by the system control information transmitted from the receipt control information processing units 71-73 and its system control information transmitted by the own node through a system control information processing function unit and supply it to the transmission frame producing units 31-33. FIG. 5 shows an example of the system control information. In FIG. 5, both master node information 3A for indicating a master node number and the like, and transmission path failure information 3C are required to be relayed to the downstream node, and also, loop back command information 3B is not required to be relayed thereto. Then, the transmission frame producing units 31-33 compose the transmission frame by the system control information from the transmission control information producing units 61-63 and the user information from the user information exchange processing units 51-53 and transmits it to the downstream node.

As described above the embodiment, the nodes do not relay the system control information which is not required to be relayed, the downstream node can use the system control information and a single node does not occupy the system control information transmission area, so that the system control information transmission area can be utilized efficiently.

In the embodiment, the ring LAN system adopting the independent synchronization system has been described by way of example, while the ring LAN system may adopt the dependent synchronization system as described above and it can attain the same effects.

Operation in failure of the ring LAN system according to the present invention is now described.

FIG. 3 shows transmission data at points A and B on the transmission paths 21 and 22, respectively, and at points C and E (FIG. 1) on the transmission path 23 in the case where a failure occurs at point D on the transmission path 23.

The node 11 can not recognize the frame transmitted by the node 13. While in the embodiment the independent synchronization system is adopted and the system control information transmission area and the user information transmission area are fixedly assigned to the frames transmitted by the nodes. Therefore, the nodes 11 and 12 can transmit the system control information and the node 12 can recognize the frame transmitted by the node 11 to receive the system control information and the user information transmitted by the node 11. Furthermore, the node 13 can recognize the frame transmitted by the node 12 and can receive the system control information and the user information transmitted by the node 11 and relayed by the node 12, and the system control information and the user information transmitted by the node 12.

Accordingly, since the extinction of the frame due to the failure does not spread to the whole system and is localized, the transmission control information producing units 61–63, the transmission frame producing units 31–33, the receipt frame decomposing units 41–43 and the receipt control information processing units 71–73 of the nodes can produce and process the system control information with the same system as usual regardless of the presence of a failure in the system.

Thus, it is not necessary to provide a circuit and algorithm for producing and processing the system control information separately depending on the cases where a failure occurs and does not occur in the system. Accordingly, the circuit and the algorithm for producing and processing the system control information can be made simple.

Figure 4:
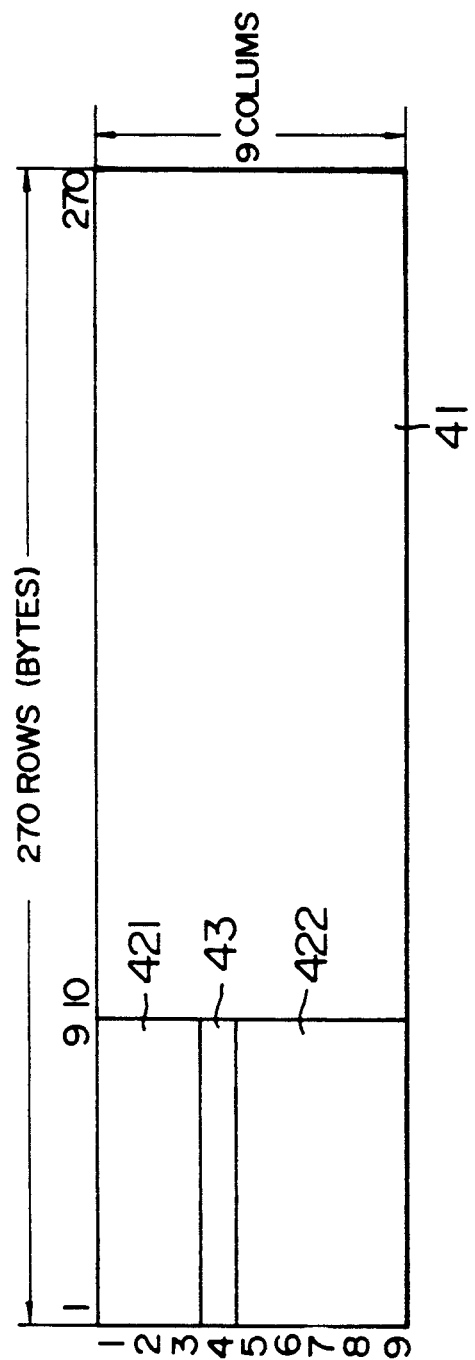
FIG. 4 illustrates a configuration of a transmission frame.

FIG. 4 shows an example of a transmission frame used in the embodiment.

As shown in FIG. 4, the configuration of the transmission frame is similar to that of the SONET frame of the CCITT standard. The transmission frame includes 2430-bytes of 270 rows and 9 columns, and a transmission period and a transmission speed are 125 $\mu$s and 155.52 Mb/s, respectively.

The bytes of the frame are transmitted in order of columns with bytes in each of the columns being transmitted in order of rows and bits in bytes being transmitted from the most significant bit to the least significant bit on the transmission path. Furthermore, the frame includes an overhead area of the first to ninth rows and a payload area 41 of the tenth to 270th rows, and the overhead area includes an AU pointer area 43 in the fourth column and a section overhead area 421 to 422 except the AU pointer area.

In this case, the payload area is used to transmit the user information and the section overhead area is used to transmit the system control information.

As described above, according to the present invention, the ring LAN system in which the data transmission devices can utilize the system control information transmission area can be efficiently provided.

Furthermore, the ring LAN system in which the data transmission devices can transmit the system control information regardless of a state of the ring LAN system, such as a failure on the transmission path, can be provided.

We claim:

1. A data transmission device for transmitting data frames on a transmission path during normal operation and during a failure on the transmission path, and adapted for connection in a ring LAN system having a plurality of data transmission devices connected to the transmission path, the data transmission device comprising:
   means for receiving a first data transmission frame comprising first and second system control information and user information, the first and second system control information being required for controlling and using the ring LAN system, the first system control information not required to be relayed to an adjacent data transmission device and the second system control information required to be relayed to the adjacent data transmission device;
   means for decomposing the first data transmission frame into the first and second system control information and the user information;
   means for processing the user information;
   means for processing the first system control information and the second system control information;
   means for composing a second data transmission frame comprising the processed user information and the second system control information; and,
   means for relaying the second data transmission frame to the adjacent data transmission device whereby the first system control information is not relayed to the adjacent data transmission device thus resulting in efficient use of the second data transmission frame.

2. A data transmission device for transmitting data frames on a transmission path and adapted for connection in a ring LAN system having a plurality of data transmission devices connected to the transmission path, the data transmission device comprising:
   means for receiving a first data transmission frame comprising first and second system control information and user information, the first and second system control information being required for controlling and using the ring LAN system, the first system control information not required to be relayed to an adjacent data transmission device and the second system control information required to be relayed to the adjacent data transmission device;
   means for decomposing the first data transmission frame into the first and second system control information and the user information;
   means for processing the user information;
   means for processing the first system control information and the second system control information;
   means for composing a second data transmission frame comprising the processed user information and the second system control information; and,
   means for relaying the second data transmission frame to the adjacent data transmission device during a failure on the transmission path whereby such failure does not inhibit relaying of the second system control information included in the second data transmission frame to the adjacent data transmission device.

* * * * *